US010904201B1

(12) United States Patent
Ermagan et al.

(10) Patent No.: US 10,904,201 B1
(45) Date of Patent: Jan. 26, 2021

(54) UPDATING DISTRIBUTED CACHES IN NETWORK DEVICES IN THE EVENT OF VIRTUAL MACHINE CHANGES IN A VIRTUALIZED NETWORK ENVIRONMENT

(71) Applicant: CISCO TECHNOLOGY, INC., San Jose, CA (US)

(72) Inventors: Vina Ermagan, San Jose, CA (US); Fabio R. Maino, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 818 days.

(21) Appl. No.: 14/051,704

(22) Filed: Oct. 11, 2013

(51) Int. Cl.
*H04L 29/12* (2006.01)
*H04L 29/06* (2006.01)
*H04L 29/08* (2006.01)
*H04L 12/24* (2006.01)

(52) U.S. Cl.
CPC ............ *H04L 61/103* (2013.01); *H04L 61/10* (2013.01); *H04L 61/106* (2013.01); *H04L 41/0813* (2013.01); *H04L 41/5025* (2013.01)

(58) Field of Classification Search
CPC ............. G06F 9/45558; G06F 9/45533; G06F 9/45545; G06F 9/5077; G06F 11/301; G06F 11/3055; G06F 11/3079; H04L 41/0893; H04L 45/74; H04L 61/103; H04L 45/50; H04L 45/306; H04L 45/54; H04L 49/70
See application file for complete search history.

(56) References Cited

U.S. PATENT DOCUMENTS

2005/0182843 A1* 8/2005 Reistad ............... H04L 41/0233
  709/230
2008/0244206 A1* 10/2008 Heo .................... G06F 12/1491
  711/163

(Continued)

OTHER PUBLICATIONS

D. Farinacci, et al., "The Locator/ID Separation Protocol (LISP)," Internet Engineering Task Force (IETF), RFC 6830, ISSN: 2070-1721, Jan. 2013, 76 pages; http://tools.ietf.org/pdf/rfc6830.pdf.

(Continued)

*Primary Examiner* — Kamal B Divecha
*Assistant Examiner* — Clifton Houston
(74) *Attorney, Agent, or Firm* — Polsinelli PC

(57) ABSTRACT

Technologies are provided in example embodiments for associating a subscriber list to mapping data of a virtual machine, adding subscriber information of a network device to the subscriber list when a map request for the mapping data is received from the network device, and purging the subscriber information from the subscriber list when a preconfigured time period assigned to the subscriber information expires. In particular embodiments, the subscriber information includes an identification of the network device and the mapping data includes a virtual address of the virtual machine mapped to a physical address of the virtual machine. More specific embodiments include sending a notification signal with new mapping data of the virtual machine to each one of one or more network devices identified in corresponding subscriber information stored in the subscriber list. In further specific embodiments, the network device is either a map server or a map resolver.

20 Claims, 7 Drawing Sheets

(56) References Cited

U.S. PATENT DOCUMENTS

| | | | | |
|---|---|---|---|---|
| 2009/0059889 A1* | 3/2009 | Baek | H04W 28/06 | 370/346 |
| 2009/0288145 A1* | 11/2009 | Huber | G06Q 20/32 | 726/3 |
| 2010/0107162 A1* | 4/2010 | Edwards | H04L 45/58 | 718/1 |
| 2010/0197275 A1* | 8/2010 | Yamasaki | H04L 65/1079 | 455/411 |
| 2010/0199276 A1* | 8/2010 | Umbehocker | G06F 9/5011 | 718/1 |
| 2010/0325191 A1* | 12/2010 | Jung | G06F 15/16 | 709/202 |
| 2011/0238820 A1* | 9/2011 | Matsuoka | G06F 11/3079 | 709/224 |
| 2012/0017211 A1* | 1/2012 | Ohno | G06F 9/5077 | 718/1 |
| 2012/0084458 A1* | 4/2012 | Britt | G06F 9/45533 | 709/236 |
| 2012/0158997 A1* | 6/2012 | Hsu | H04L 45/66 | 709/242 |
| 2013/0055246 A1* | 2/2013 | Li | G06F 9/45558 | 718/1 |
| 2013/0086236 A1* | 4/2013 | Baucke | H04L 45/50 | 709/223 |
| 2013/0232492 A1* | 9/2013 | Wang | G06F 9/4856 | 718/1 |
| 2013/0254424 A1* | 9/2013 | Guay | H04L 45/00 | 709/238 |
| 2013/0275592 A1* | 10/2013 | Xu | H04L 63/20 | 709/225 |
| 2013/0283171 A1* | 10/2013 | Schick | H04L 67/10 | 715/733 |
| 2013/0311991 A1* | 11/2013 | Li | H04L 61/103 | 718/1 |
| 2013/0318191 A1* | 11/2013 | Yin | H04L 67/2847 | 709/213 |
| 2014/0052877 A1* | 2/2014 | Mao | H04L 12/4641 | 709/245 |
| 2014/0056299 A1* | 2/2014 | Mitsunobu | H04L 45/74 | 370/389 |
| 2014/0098814 A1* | 4/2014 | Bansal | G06F 9/45558 | 370/390 |
| 2014/0222885 A1* | 8/2014 | Mohan | H04L 67/10 | 709/201 |
| 2014/0250220 A1* | 9/2014 | Kapadia | G06F 9/5077 | 709/224 |
| 2015/0074261 A1* | 3/2015 | Garg | H04L 43/00 | 709/224 |

OTHER PUBLICATIONS

V. Fuller, et al., "The Locator/ID Separation Protocol (LISP) Map-Server Interface," Engineering Task Force (IETF), RFC 6833, ISSN: 2070-1721, Jan. 2013, 76 pages; http://tools.ietf.org/pdf/rfc6833.pdf.

* cited by examiner

UPDATING DISTRIBUTED CACHES IN NETWORK DEVICES IN THE EVENT OF VIRTUAL MACHINE CHANGES IN A VIRTUALIZED NETWORK ENVIRONMENT

TECHNICAL FIELD

This disclosure relates in general to the field of network virtualization, and more particularly, to updating distributed caches in network devices in the event of virtual machine changes in a virtualized network environment.

BACKGROUND

Networking architectures have grown increasingly complex in communication environments. Local area networks (LANs) can be configured with network overlays, which are logical topologies between different endpoints in the LAN. A logical topology refers to the arrangement of devices in a network and how they communicate across the physical connections. Generally, overlays have enabled network virtualization. Network virtualization uses software to manage the sharing of storage and compute resources and applications, which can be accessed without regard to the underlying physical hardware. A virtual extensible local area network (VXLAN) is an example of a network overlay. VXLAN is an encapsulation protocol for running an overlay network on existing Layer 3 infrastructure. Network Virtualization using Generic Routing Encapsulation (NVGRE) is another example of a network overlay. NVGRE uses Generic Routing Encapsulation (GRE) to tunnel layer 2 packets over layer 3 networks. Although overlays enable network virtualization, managing changes to virtualized networks with overlays in large scale implementations presents challenges for network administrators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method for updating distributed caches in network devices in the event of virtual machine changes in a virtualized network environment is provided in one example and includes associating a subscriber list to mapping data of a virtual machine, adding subscriber information of a network device to the subscriber list when a map request for the mapping data is received from the network device, and purging the subscriber information from the subscriber list when a preconfigured time period assigned to the subscriber information expires. The network device can be an edge device or a map resolver. The subscriber information can include an identification of the network device, which can be a device identifier and address information. The address information could include an Internet Protocol address and a control port of the network device. The mapping data can include a virtual address of the virtual machine mapped to a physical address of the virtual machine.

Specific embodiments include sending a notification signal with new mapping data of the virtual machine to each one of one or more network devices identified in corresponding subscriber information stored in the subscriber list. In more specific embodiments, the purging includes purging other subscriber information of at least one other network device in the subscriber list when another preconfigured time period assigned to the other subscriber information has expired. In at least some embodiments, each network device that has previously sent a map request for the mapping information is identified in corresponding subscriber information in the subscriber list if a corresponding preconfigured time period assigned to the corresponding subscriber information has not expired.

Example Embodiments

Figure 1:
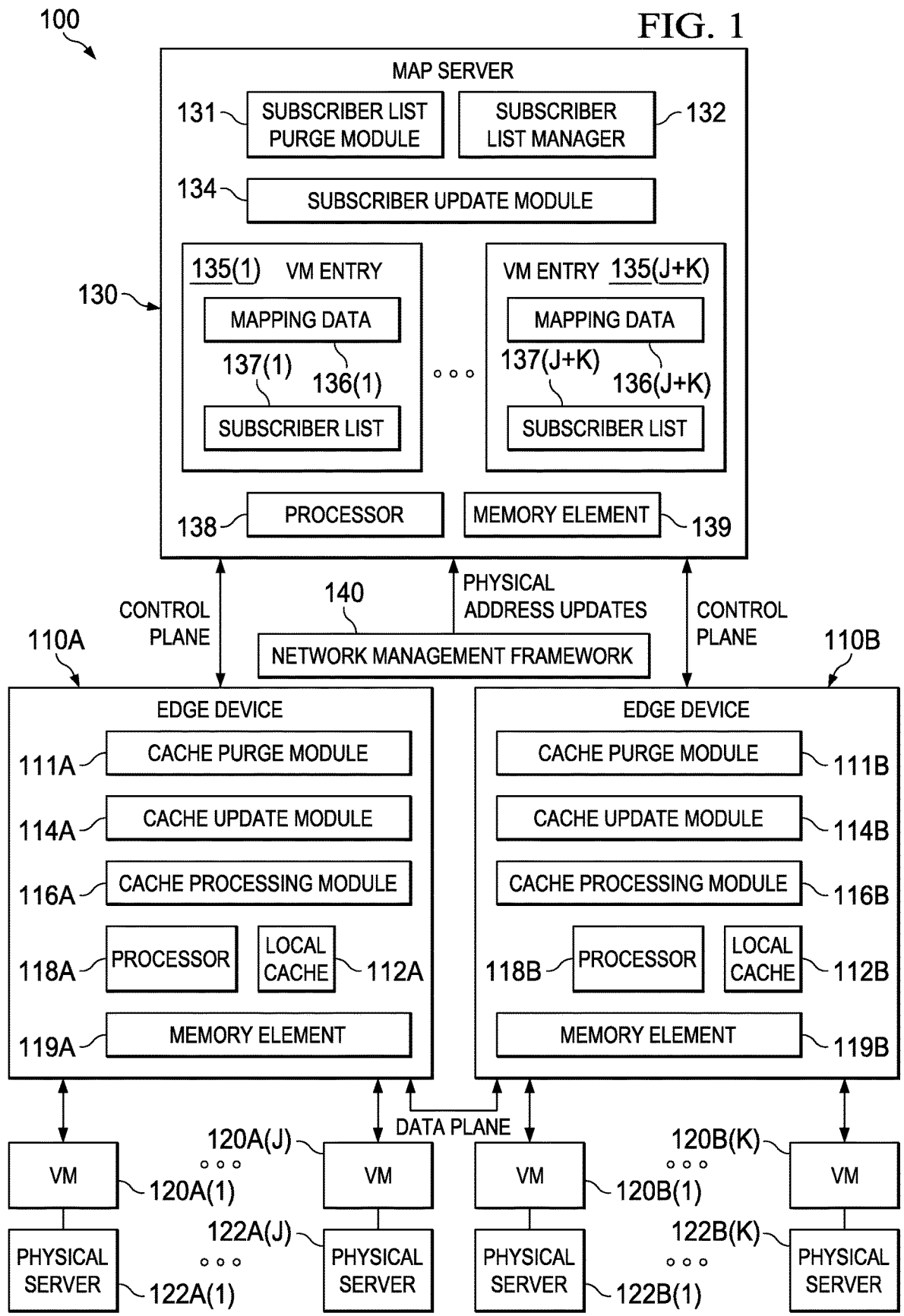
FIG. 1 is a simplified block diagram of an example computing system for updating distributed caches of network devices in the event of virtual machine changes in a virtualized network environment according to at least one embodiment.

Turning to FIG. 1, FIG. 1 is a simplified block diagram of a computing system 100 for updating distributed caches of network devices in the event of virtual machine changes in a virtualized network environment. A control plane based overlay may be provided in the virtualized network environment to enable communication of reachability information (e.g., physical addresses, virtual addresses) of end hosts and other network devices, such as edge devices 110A and 110B. Edge devices 110A and 110B in FIG. 1 are configured for communication with a map server 130 via the control plane in the virtualized network. Edge devices 110A and 110B may also be configured to enable communications between one or more virtual machines, and other nodes in the network or in other networks. By way of example in FIG. 1, edge device 110A is configured to facilitate communications to and from virtual machines 120A(1)-(J), and edge device 110B is configured to facilitate communications to and from virtual machines 120B(1)-(K).

Various modules and components may be configured in each of the network devices provided in FIG. 1. Edge devices 110A and 110B can include respective cache purge modules 111A and 111B, local caches 112A and 112B, cache update modules 114A and 114B, and cache processing modules 116A and 116B. Edge devices 110A and 110B, can also include appropriate hardware such as, for example, respective processors 118A and 118B and memory elements 119A and 119B. Map server 130 may include a subscriber list purge module 131, a subscriber list manager 132, a subscriber update module 134, and virtual machine (VM) entries 135(1)-(J+K) for each virtual machine 120A(1)-(J) and 120B(1)-(K) in the network. Each VM entry can include a mapping data (e.g., mapping data 136(1)-(J+K)) and a subscriber list (e.g., subscriber lists 137(1)-(J+K)). In FIG. 1, 'J+K' corresponds to the number of virtual machines (e.g., 120A(1)-(J) and 120B(1)-(K)) in the network. A subscriber list and mapping data in a VM entry are associated with a virtual machine identified by the VM entry. Mapping data in a VM entry provides a virtual to physical address mapping for a virtual machine identified by the VM entry. A 'mapping' of a virtual address to a physical address, as used herein, is intended to mean the addresses are associated, linked, connected, or otherwise related to one another. Map server 130 can also include at least one processor 138 and at least one memory element 139. A network management framework 140 may also be provided to communicate with map server 130 to provide physical address updates (e.g., mapped to virtual machines) as changes occur in the virtualized network environment.

For purposes of illustrating certain example techniques of computer system 100, it is important to understand the communications that may be traversing the virtualized network and the protocols used in effecting such communications. The following foundational information may be viewed as a basis from which the present disclosure may be properly explained.

Network overlays forward traffic based on two tiers of information: an overlay tier and an underlay tier. The underlay tier defines how network devices can reach each other and is commonly used in traditional networking. In the overlay model, the underlay protocol does not carry information about end hosts (e.g., virtual machines (VMs)) connected to the network, but may include only information about the reachability of the different network devices in the topology. The overlay tier maps the different end hosts to virtualization edge devices (also referred to herein as 'edge devices') in the network. The edge device could be a physical network device or a virtual network device (e.g., a virtual switch) to which the end hosts are attached. A 'virtual switch' is intended to mean a virtual switching element with a hypervisor. Each edge device in a network has a particular location, which can be a network address such as, for example, an Internet Protocol (IP) address.

In an overlay based virtualized network, the boundary (i.e., edge devices) of the overlay needs to know where the destinations are located so that packets can be correctly encapsulated to those destinations. The reachability of a VM depends on two addresses: a virtual address and a physical address. The virtual address is an L2 or L3 address associated with the VM. The physical address is the L3 address of the physical server or hypervisor hosting that VM. In order to preserve L3 connections as VMs move from one physical server to another, the virtual address of the VM stays the same, while the physical address (or location) changes from the old server to the new server. In order to preserve reachability of the VM, the mapping of a VM's virtual address to its physical address has to be known. A mapping system (which can include one or more map servers) can be used to store mapping information of VM virtual addresses to physical addresses in the virtualized network.

Typically, when an edge device receives a flow of traffic with a virtual address as a destination, the edge device can query a map server to retrieve the physical address associated with the virtual machine. The edge device can encapsulate the traffic towards that physical address. The edge device may cache this mapping data locally for a predetermined period of time to avoid queries for every packet received.

Locator/Identifier Separation Protocol (LISP) is a network architecture and set of protocols that implements a semantic for IP addressing using endpoint identifiers (EIDs), which are assigned to end hosts, and Routing Locators (RLOCs), which are assigned to edge devices. Edge devices can be network devices (e.g., routers, switches), that make up the routing system. LISP, even when used to control VXLAN and NVGRE overlays, is one example of an architecture for network virtualization where a mapping system stores the mapping information between the virtualized overlay and the physical underlying network. LISP is more fully explained in Requests for Comments (RFC) 6830 entitled, "The Locator/ID Separation Protocol (LISP)," by Farinacci, D., Fuller, V., Meyer, D., and D. Lewis, dated January 2013. LISP standards are being developed as open standards within the Internet Engineering Task Force (IETF) LISP Working Group.

Enabling overlays in very large-scale data centers with dynamic workloads and virtual machine migrations, and other changes, presents challenges to network operators. Propagating changes (e.g., due to VM migration) in an overlay based virtualized network is typically limited in scale and often accompanied by undesirable latency and delays. Initially, when an overlay based virtualized network is provisioned with virtual machines and a mapping system, edge devices in the virtualized network know where to send packets they receive. When an edge device gets a packet, the edge device can determine a flow based on cached mapping information, for sending the packet to the appropriate destination VM. Although the mapping system may be updated with current location or physical addresses of a migrating VM, edge devices with cached mapping information of a migrating VM also need to be updated so that flows can be properly redirected. Typically, if an edge device receives a packet and knows the VM has moved, a response is sent to trigger the sender to look for an update in a map server of the mapping system. This reactive approach to VM migrations can lead to unnecessary packet transmissions for any number of edge devices in a particular network. Consequently, packet losses and time latency from several round trip transmissions can result. Additionally, scalability of mapping systems is an important challenge, because network virtualization deployments often include a very large number of network devices.

Example embodiments of a computing system, as described herein, can resolve the aforementioned issues (and others) with managing large scale overlay based virtualized networks. Example embodiments herein offer a proactive, scalable technique for propagating changes in a virtualized network to edge devices with previously cached mapping data. More particularly, computing system 100 provides for proactively updating distributed caches of edge devices in the event of virtual machine migration, or other changes, in order to keep the distributed cache information fresh. A map server keeps track of network devices (such as edge devices and/or map resolvers) that query the map server to determine where a virtual machine is located on the physical network.

An edge device that queries the map server for mapping data of a virtual machine can register with the map server to subscribe to the virtual machine. Whenever a change occurs for that virtual machine (e.g., moves, dies, etc.), then all of the edge devices that have subscribed to the identity of that virtual machine can be notified of the change. Accordingly, any of the subscribed edge devices can automatically redirect flows to the new destination address for the virtual machine, without unnecessarily sending packets to an invalid address for the virtual machine. Similarly, a map resolver can act as a proxy to map server 130 for edge devices and can query map server 130 for mapping data of a virtual machine. The map resolver can register with the map server to subscribe to the virtual machine and then receive notifications when changes occur for the virtual machine. A notification for the virtual machine, received by the map resolver, can be propagated to edge devices that subscribe to the virtual machine at the map resolver.

Embodiments disclosed herein, both with and without map resolvers offer several advantages. Keeping the distributed cache mapping data current, particularly after virtual machine migration events, can reduce latency and delay and can enhance robustness of the network virtualization solution. Scalability is also achieved by embodiments disclosed herein. Embodiments disclosed herein are especially advantageous for architectures, such as LISP, which store mapping information between a virtualized overlay and the physical underlying network.

Turning to the infrastructure of FIG. 1, computing system 100 represents a series of points or nodes of interconnected communication paths for receiving and sending communications that propagate through the system. Elements of FIG. 1 may be coupled to one another through one or more virtual or physical interfaces employing any suitable connection (wired or wireless), which provides a viable pathway for electronic communications.

The teachings of this disclosure can be implemented in many different types or topologies of networks including, but not limited to, a local area network (LAN), wireless local area network (WLAN), Intranet, Extranet, virtual local area network (VLAN), virtual private network (VPN), virtual extensible local area network (VXLAN), virtual private LAN service (VPLS), or any other appropriate architecture or system that facilitates communications in a virtualized network environment and in which a network overlay can be implemented. These networks may be inclusive of any number of wire line (e.g., Ethernet, etc.) and wireless technologies (e.g., Institute of Electrical and Electronics Engineers (IEEE) Std 802.11™-2012, published Mar. 29, 2012, IEEE Std 802.16™-2012, published Aug. 17, 2012, WiFi, WiMax, Dedicated short Range Communications (DSRC), etc.), satellite, cellular technologies (e.g., 3G/4G/5G/nG, etc.), other radio frequencies (e.g., near field communications (NFC), radio frequency identification (RFID), etc.), and/or any other networking protocols that facilitate network communications in a virtualized network environment. As used herein, a 'virtualized network' is intended to mean a computer network in which networking resources (e.g., bandwidth, network interfaces, etc.) are virtualized. A virtualized network, as used herein, is intended to include one or more virtual devices including virtual machines and a hypervisor, which may be implemented in a physical server.

Communications in a network environment are referred to herein as 'network traffic' or 'traffic', which may be inclusive of packets. A packet is a formatted unit of data, and can contain both control information (e.g., source and destination addresses, etc.) and data, which is also known as payload. A single communication from a source end host, such as an electronic mail message for example, may be broken up into multiple discrete packets with different payloads.

Network traffic can be sent and received according to any suitable communication messaging protocols. Suitable communication messaging protocols can include a multi-layered scheme such as Open Systems Interconnection (OSI) model, or any derivations or variants thereof (e.g., transmission control protocol/IP (TCP/IP), user datagram protocol/IP (UDP/IP), etc.). The term 'data' as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, replies, queries, etc. are forms of network traffic, and therefore, may comprise packets.

In at least one embodiment, physical servers 122A(1)-(J) and 122B(1)-(K) are attached to edge devices 110A and 1106, respectively. Edge devices 110A and 1106 can provide network access to VMs 120A(1)-(J) and 120B(1)-(K), respectively, of the physical servers. Such network access could include, but is not limited to, communication with other VMs or nodes within the virtualized network, or with remote nodes via another network such as a WAN (e.g., the Internet), a VPN, an Extranet, etc. Moreover, although edge devices 110A, 110B are shown with attachments to only virtual machines, physical devices could be attached to any one or more edge devices in the network.

For ease of reference, computing system 100 is illustrated with only two edge devices 110A and 110B configured for communication with map server 130 via control planes and configured for communication to each other via a data plane. It will be apparent, however, that any number of other edge devices could be configured to provide network access to and from other virtual machines in computing system 100. In addition, for simplicity, a single virtual machine is illustrated as being hosted on each one of physical servers 122A(1)-(J) and 122B(1)-(K). It will be apparent that, depending on the particular implementation, physical servers 122A(1)-(J) and 122B(1)-(K) in computing system 100 could each host one or more virtual machines.

In at least one embodiment, the mapping system and edge devices of a computing system work together to provide a proactive approach to updating distributed caches as changes occur. Map server 130 maintains a current mapping of each VM virtual address to its corresponding physical address, indicated by mapping data 136(1)-(J+K) of VM entries 135(1)-(J+K). Physical address updates can be provided to map server 130 by network management framework 140, which may facilitate VM migrations and other VM changes in the network. Map server 130 can be updated by network management framework 140 with the current physical address of a VM, when the VM moves or experiences other changes (e.g., is removed or added) resulting in an new physical address for the VM. An edge device assigned as the new location of a virtual machine can also update map server 130. In at least one embodiment, each VM entry 135(1)-135(J+K) corresponds to one VM connected to an edge device in the network. For example, and for purposes of explanation herein, VM entry 135(1) identifies and corresponds to VM 120A(1) and VM entry 135(J+K) identifies and corresponds to VM 120B(K). Thus, in this example, mapping data 136(1) provides the virtual to physical address mapping for VM 120A(1), and mapping data 136(J+K) provides the virtual to physical address mapping for VM 120B(K).

For each one of VM entries 135(1)-(J+K), a subscriber list can also be maintained. A subscriber list for a particular VM can include a list of edge devices that, at any given time, have mapping data cached locally for that particular VM. Any network device (e.g., edge devices 110A, 110B) that sends a map request to a map server, or to a proxy for a map server, for mapping data of a VM, and then stores the mapping data of the VM locally in cache, may be referred to herein as a 'subscriber' of that particular VM. Edge device 110A, for example, becomes a subscriber of a VM when edge device 110A sends a map request to map server 130 to obtain mapping data of the VM. Edge device 110A can send the map request when it receives packets to be forwarded to the VM. Map server 130 can respond to edge device 110A with the appropriate mapping data, and edge device 110A can store the mapping data in local cache 112A. Thus, the map request serves as notification to map server 130 that a caching (of mapping data) will occur in the edge device, once the edge device receives a response from map server 130. Accordingly, map server 130 can maintain a subscriber list per each mapping data that is stored in a local cache.

In at least one embodiment, a response from map server 130 can also include a caching time-to-live (TTL) for mapping data to be stored in a local cache. The caching TTL for mapping data represents a time period assigned to the mapping data during which the edge device allows the mapping data to remain cached in the local cache before being purged. In at least one embodiment, the caching TTL is configurable. In at least one embodiment, the caching TTL can be configurable based on the destination VM, the subscriber, or a combination thereof. For example, if the chance of changing/moving a destination VM is low, then a caching TTL assigned to mapping data of that destination VM may be relatively long in comparison to caching TTLs assigned to other VMs. Alternatively, caching TTLs could be preconfigured default values.

A subscriber list in a VM entry stores information for each edge device subscribed to the VM identified by the VM entry. This subscriber information includes information required to reach any subscribed edge device. For example, subscriber list 137(1) of VM entry 135(1), which corresponds to VM 120A(1) in an example, stores information required to reach edge device 110B if edge device 110B has subscribed to VM 120A(1) and thus, has mapping data of VM 120A(1) stored in local cache 112B. In at least one embodiment, this reachability information is an identification of the edge device and can include, for example, a device identifier (ID), or device Internet Protocol (IP) address and control port, or any combination thereof, depending on the properties of the deployed network architecture.

Subscriber information for a particular edge device subscribed to a VM can also include a timestamp of the time when the edge device made its last query to map server 130 for mapping data of the VM. The caching time-to-live (TTL) assigned to the mapping data cached in the subscriber (e.g., edge device 110B) may also be assigned to the subscriber information for that subscriber. In at least one embodiment, the caching TTL of the mapping data for a particular VM is a time period that is also assigned to the corresponding subscriber information, during which map server 130 allows the subscriber information to remain listed on the subscriber list of the particular VM before being purged. The subscriber information can be removed from the subscriber list when the current time minus the caching TTL of the subscriber information is greater than the timestamp recorded for the subscriber. In this implementation, the subscriber information in the subscriber list in map server 130 can be purged at the same time the mapping data is purged from the local cache of the subscriber.

In other instances, depending on the configuration for a particular destination and subscriber, subscriber information in a subscriber list may be assigned a different caching TTL than the caching TTL assigned to the corresponding mapping data cached in the subscriber Additionally, a lazy cleanup technique may be used to eventually remove expired subscriber information from subscriber lists 137(1)-(J+K). This periodic processing of the lists, in addition to processing at the time of updates (e.g., when a new subscriber is added to a subscriber list, or when mapping data is updated) keeps the subscriber lists current by removing stale entries.

Mapping data in a VM entry (e.g., mapping data 136(1) of VM entry 135(1)), can be updated by network management framework 140 with a new physical address for the VM, when the physical address for the VM changes (e.g., the VM is migrated to another physical server). An update to mapping data of a particular VM triggers map server 130 to notify subscribers in the associated subscriber list of the change. Map server 130 can generate a notification signal with the new mapping data and send it to all valid subscribers in the subscriber list associated with that VM.

By way of example, if VM 120A(1) is migrated to physical server 122A(J), then mapping data 136(1) of VM entry 135(1) is updated with the physical address of physical server 122A(J), for example, based on physical address updates received from network management framework 140. The change to mapping data 136(1) triggers map server 130 to generate a notification signal to all valid subscribers in subscriber list 137(1) of VM entry 135(1). The notification signal informs receiving edge devices (such as edge device 110B if it is a subscriber of VM 120A(1)) of the new physical address of VM 120A(1). In this scenario, the new physical address is the address of physical server 122A(J).

Edge devices 110A and 110B maintain respective local caches 112A and 112B with mapping data for VMs, to which edge devices 110A and 110B subscribe. When edge device 110A or 110B receives a notification signal from map server 130, then local cache 112A or 112B is updated according to the new mapping data in the notification signal. In at least one embodiment, the caching TTL assigned to local cached mapping data at a subscriber (e.g., edge device 110A or 110B) is not changed when a notification signal is received from map server 130. Thus, this unsolicited notification serves as a temporary update until the caching TTL of the local cached mapping data expires. Once the caching TTL expires, if the edge device receives additional network traffic for the same destination VM, the edge device can send a new map request to map server 130 to obtain updated mapping data for the destination VM and, a new caching TTL for the mapping data. In addition, the map request triggers map server 130 to add the edge device back to the subscriber list for the VM.

Not updating the caching TTL assigned to the mapping data when an unsolicited update of the mapping data is received provides several advantageous. First, excessively long subscriber lists 137(1)-(J+K) in map server 130 can be prevented. Also, map server 130 is relieved from making changes to subscriber lists 137(1)-(J+K), other than periodic cleanup, when mapping data changes occur (e.g., VM migration). This can be desirable because in a large scale deployment, the load on map server 130 could become significant. By minimizing the operations on map server 130 and putting mechanisms in place for maintaining the size of subscriber lists 137(1)-(J+K) to a minimum, the processing by map server 130 can be optimized.

Turning to FIGS. 2-7, example flow diagrams illustrate activities that may be associated with embodiments of computing system 100 for updating distributed caches of network devices. For illustration purposes in the description of the flow diagrams of FIGS. 2-7, references may be made to FIG. 1, and to particular components of FIG. 1. It will be assumed that VM entry 135(1) corresponds to VM 120A(1), and that mapping data 136(1) initially contains a mapping of VM 120A(1) to physical server 122A(1). It will be further assumed that VM 120A(1) migrates to physical server 122A(J). This scenario is for illustration purposes only, and any number of other scenarios and conditions may occur in computing system 100.

Figure 2:
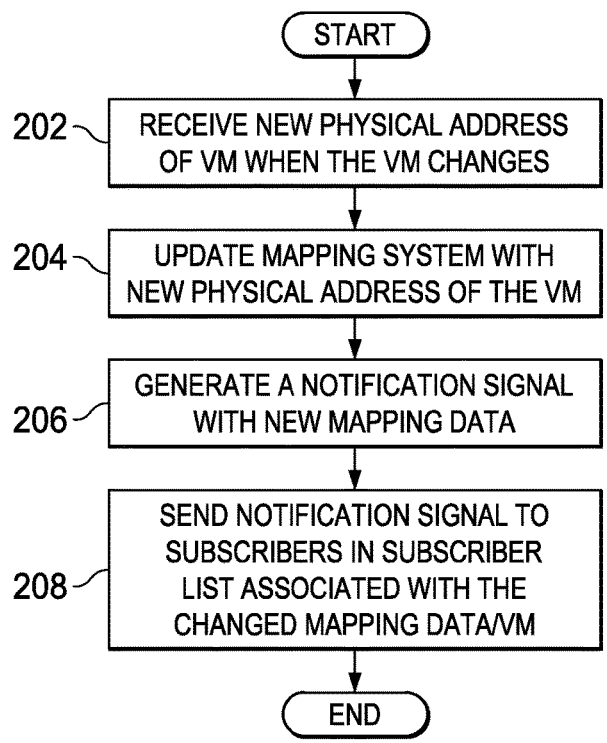
FIG. 2 is a flowchart illustrating operations associated with the computing system according to at least one embodiment.

FIG. 2 is a flow chart illustrating possible operations associated with embodiments of computing system 100. In an example, map server 130 may perform one or more operations of FIG. 2. In at least one embodiment, subscriber update module 134 of map server 130 is configured to perform, when executed by at least one processor, one or more operations of the operations of FIG. 2.

At 202, map server 130 receives a new physical address of a VM that has changed. For instance, VM 120A(1) may have been migrated to a different server, added to a server, or removed from a server. If VM 120A(1) is migrated to physical server 122A(J), for example, then map server 130 receives the new physical address of physical server 122A(J) mapped to a virtual address of VM 120A(1). The physical address updates may be received from network management framework 140 in at least one embodiment. The physical address updates could also be received from edge device 110A, which is the edge device assigned to the new location of VM 120A(1).

At 204, map server 130 may be updated with the new physical address. Mapping data of a VM entry corresponding to the VM that has changed, may be updated with the new physical address of the VM. For example, mapping data 136(1) of VM entry 135(1) may be updated with the new physical address of physical server 122A(J). The update to the mapping data can trigger the map server to generate a notification signal with the new mapping data. At 206, the notification signal is generated. At 208, the notification signal is provided to subscribers in a subscriber list of the VM entry that corresponds to the changed VM. For example, map server 130 may send the notification signal to the subscribers in subscriber list 137(1), which is associated with VM 120A(1). If edge device 110B is a subscriber of VM 120A(1), then the notification signal can be sent to edge device 110B, in addition to other subscribers in subscriber list 137(1).

Figure 3:
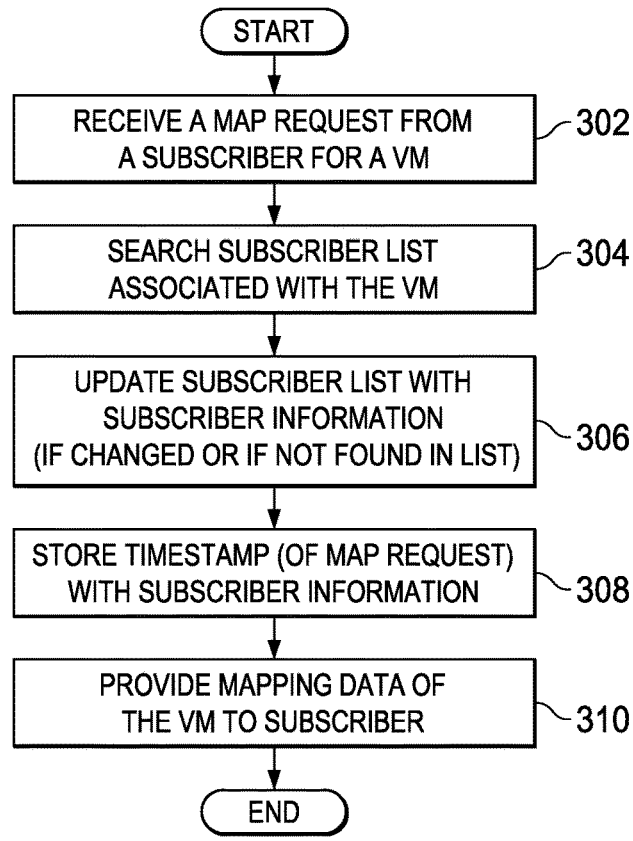
FIG. 3 is a flowchart illustrating further operations associated with the computing system according to at least one embodiment.

FIG. 3 is a flow chart illustrating possible operations associated with embodiments for updating distributed caches of network devices. In an example, map server 130 may perform one or more operations of FIG. 3. In at least one embodiment, subscriber list manager 132 of map server 130 is configured to perform, when executed by at least one processor, one or more of the operations of FIG. 3.

At 302, map server 130 receives a map request from an edge device. By way of example, assume VM 120A(1) is the destination VM in network traffic received by edge device 110B. In this scenario, edge device 110B can send a map request to obtain mapping data for VM 120A(1), if there is no mapping data of VM 120A(1) currently cached in edge device 110B. In map server 130, a subscriber list (e.g., 137(1)) may be associated with mapping data (e.g., 136(1)) of the VM. At 304, map server 130 may search subscriber list 137(1). If a subscriber list is not already associated with the mapping data of the VM, however, then it may be created and associated (e.g., linked, mapped, related to, stored with, etc.) with the mapping data. At 306, the subscriber list can be updated with subscriber information. For example, if edge device 110B sent the map request, but is not found in subscriber list 137(1), then an identification of edge device 110B (e.g., device ID, IP address and control port) may be added to subscriber list 137(1). Also, a caching TTL may be assigned to the subscriber information to provide a time period during which the subscriber information will not be purged from subscriber list 137(1). If edge device 110B is found in subscriber list 137(1), then its information may be updated if needed. In some instances this could occur when the subscriber information is no longer valid (e.g., it's caching time-to-live period has expired) but has not yet been purged.

At 308, a timestamp may be stored with subscriber information in subscriber list 137(1). In one example, the timestamp may be a timestamp corresponding to when the map request was sent or received. At 310, mapping data of the VM may be provided to the subscriber. For example, mapping data 136(1) of VM entry 135(1) may be provided to edge device 110B. Also, a caching TTL for the mapping data may be provided to edge device 110B. In at least one embodiment, the caching TTL assigned to the mapping data may be equivalent to the caching TTL assigned to the subscriber information.

Figure 4:
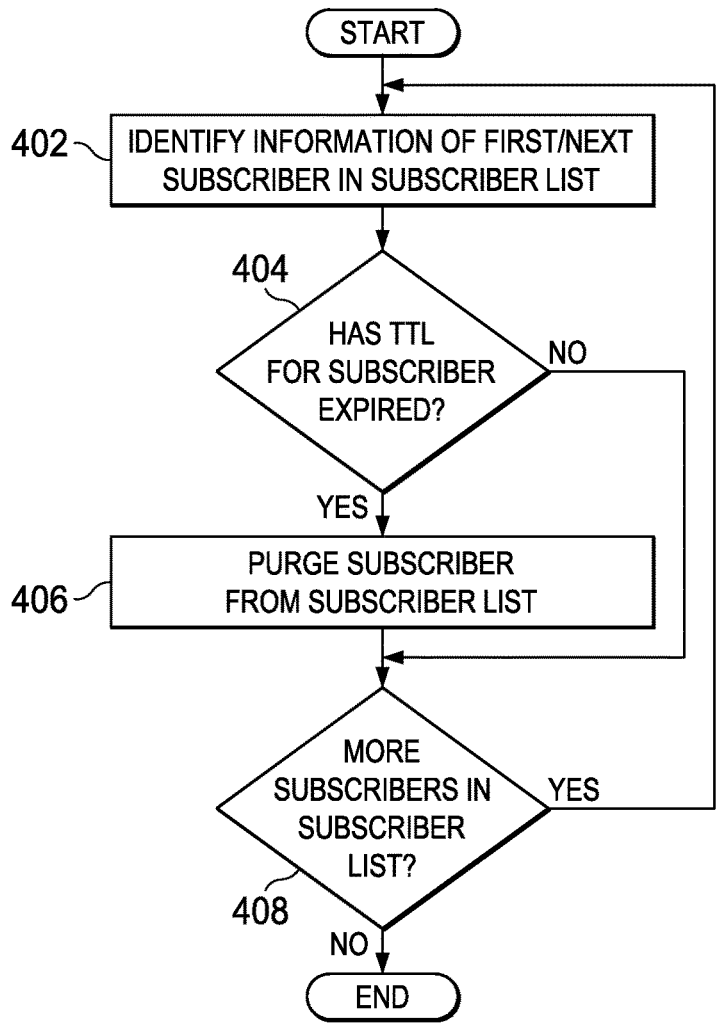
FIG. 4 is a flowchart illustrating yet further operations associated with the computing system according to at least one embodiment.

FIG. 4 is a flow chart illustrating possible operations associated with embodiments of computing system 100. In an example, map server 130 may perform one or more operations illustrated in FIG. 4. In at least one embodiment, subscriber purge module 131 of map server 130 is configured to perform, when executed by at least one processor, one or more of the operations of FIG. 4.

Operations of FIG. 4 may be performed to purge a subscriber list (e.g., 137(1)-(J+K)) of subscribers whose caching TTLs have expired. This may also be referred to as 'lazy cleanup' for a subscriber list. Operations of FIG. 4 may be performed periodically (e.g., predetermined periods of time), or when certain events occur, or any combination thereof. For example, the processing may occur each time a physical address update is received from network management framework 140. Purging subscribers with expired TTLs could prevent unnecessary overhead in sending update notifications for a VM change to subscribers that no longer need mapping data cached for that VM.

At 402, information of a first subscriber in a subscriber list, such as subscriber list 137(1) of VM entry 135(1), is read or otherwise obtained. The subscriber information could include a timestamp associated with a previous map request that resulted in the subscriber information of the first subscriber being added to the subscriber list (e.g., when the map request was sent to or received by map server 130, when the response to the map request was sent to or received by the edge device). The subscriber information could also include a caching TTL assigned to the subscriber, which could be equivalent to the caching TTL assigned to the corresponding mapping data stored in the first subscriber. For example, assume VM entry 135(1) corresponds to VM 120A(1). If the first subscriber represented in subscriber list 137(1) is edge device 110B, the caching TTL assigned to the subscriber information of the first subscriber can be equivalent to as the caching TTL assigned to the local cached mapping data of VM 120A(1), which is stored in local cache 112B of edge device 110B.

At 404, a determination is made as to whether the caching TTL assigned to the subscriber information for the first subscriber has expired. This determination can be made by determining whether the current time minus the caching TTL in the subscriber information is greater than the timestamp recorded for the first subscriber. If the current time minus the caching TTL of the first subscriber is greater than the timestamp in the subscriber information, then at 406, the subscriber information of the first subscriber (e.g., edge device 110B) can be purged from subscriber list 137(1). However, if the current time minus the caching TTL of the first subscriber is not greater than the timestamp in the subscriber information, then flow continues to 408. At 408, it is determined whether more subscribers are listed in subscriber list 137(1). If there are more subscribers, then flow continues at 402 where the information of a next subscriber in the subscriber list is evaluated to determine whether it should be purged. If there is no more subscriber information in the subscriber list, as determined at 408, then the flow may end.

Figure 5:
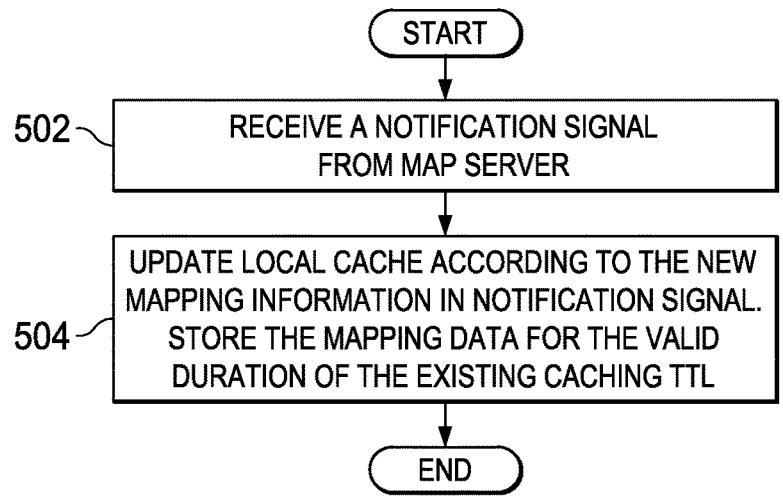
FIG. 5 is a flowchart illustrating yet further operations associated with the computing system according to at least one embodiment.

Turning to FIG. 5, FIG. 5 is a flow chart illustrating example operations that may be associated with embodiments of computing system 100. In an example, edge devices 110A, 110B may perform one or more of the operations illustrated in FIG. 5, to update local caches 112A, 112B when a virtual machine with locally cached mapping data has changed. In at least one embodiment, cache update modules 114A, 114B of edge devices 110A, 110B are each configured to perform, when executed by one or more processors, one or more operations of FIG. 5.

At 502, an edge device (e.g., 110B) receives a notification signal from map server 130. The notification signal indicates new mapping data for a virtual machine (e.g., 120A(1)). Old mapping data for the VM may be currently stored in local cache (e.g., 112B) of the edge device. In at least one embodiment, the notification signal for the VM is not sent to an edge device unless the edge device is a subscriber to the VM, and therefore, has mapping data for the VM locally cached. At 504, the local cache is updated according to the new mapping data received in the notification signal.

In at least one embodiment, a new caching TTL is not assigned to the new mapping data and, therefore, is not included in the notification signal and is not updated in the local cache. Thus, the new mapping data can be purged from the local cache when the old caching TTL expires. Additionally, if the caching TTLs currently assigned to the mapping data and the subscriber information of the edge device are equivalent, then the subscriber information can be purged from the subscriber list associated with the VM when the current caching TTL expires. Thus, if the edge device does not receive more network traffic for the VM, the new mapping data does not remain stored in the local cache unnecessarily. Furthermore, the edge device does not subscribe to the VM again until new network traffic for the VM is received by the edge device. This can help maintain the size of the subscriber list to a minimum.

By way of example, assume edge device 110B is a subscriber to VM 120A(1). Thus, edge device 110B has mapping data of VM 120A(1) stored in local cache 112B, and map server 130 has subscriber information of edge device 110B stored in subscriber list 137(1) of VM entry 135(1), which corresponds to VM 120(A)(1). If VM 120A(1) migrates to physical server 122A(J), then at 502, edge device 110B receives a notification signal from map server 130 indicating new mapping data for VM 120A(1). The new mapping data includes a physical address of physical server 122A(J). At 504, local cache 112B can be updated according to the new mapping information in the notification signal. The caching TTL currently assigned to the mapping data of that VM remains the same, and the caching TTL assigned to the subscriber, which can be stored in subscriber list 137(1), also remains the same.

Figure 6:
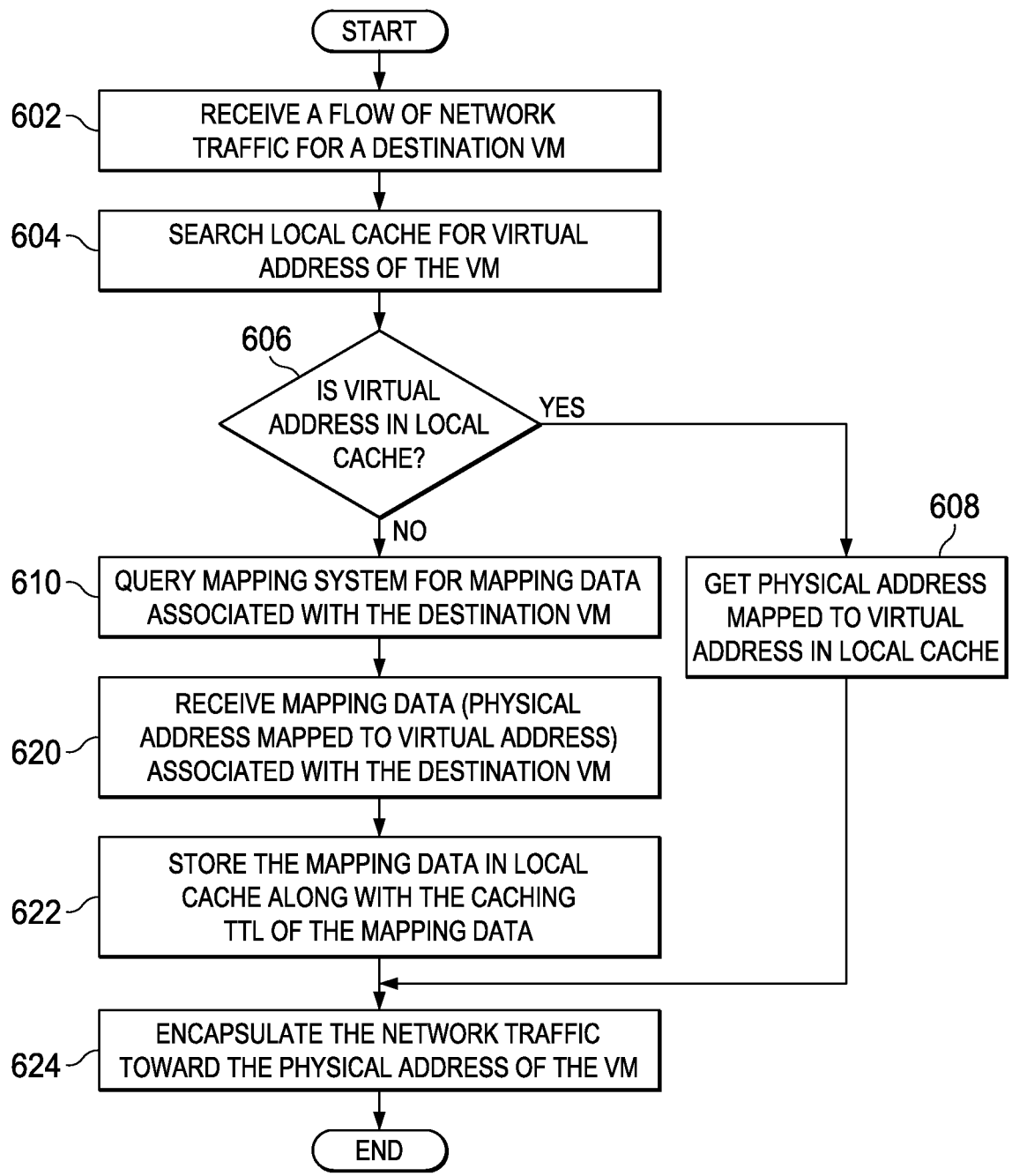
FIG. 6 is a flowchart illustrating yet further operations associated with the computing system according to at least one embodiment.

FIG. 6 is a flow chart illustrating example operations that may be associated with embodiments of computing system 100. In an example, edge devices 110A, 110B may perform one or more of the operations illustrated in FIG. 6, when network traffic is received for a particular virtual machine. In at least one embodiment, cache processing modules 116A, 116B of edge devices 110A, 110B are each configured to perform, when executed by one or more processors, one or more operations of FIG. 6.

At 602, an edge device (e.g., 110B) receives a flow of network traffic for a destination virtual machine (e.g., 120A (1)). The network traffic may include the virtual address of the virtual machine as the destination address. At 604, the edge device can search its local cache (e.g., 112B) for the virtual address of the virtual machine. At 606, a determination is made as to whether the virtual address was found in the local cache. If it was found, then at 608, the physical address mapped to the virtual address is obtained from the mapping data identified in the local cache.

In one possible embodiment, when the virtual address is found in the local cache, the caching TTL of the mapping data may be evaluated to determine whether it has expired. If it has expired, then the mapping data can be removed from the local cache, and flow may continue at 610. In other embodiments, however, the caching TTL may not be checked for every flow of network traffic. Instead, local cache may be purged periodically.

If the virtual address is not found in the local cache, however, then at 610, the edge device can query map server 130 for mapping data of the virtual machine. The mapping data is requested in order to obtain the physical address associated with the virtual machine. At 620, the edge device receives the mapping data associated with the destination virtual machine. In addition, the edge device may also receive a caching TTL of the mapping data. The caching TTL may be configured based on the virtual machine, the edge device, or a combination thereof. At 622, the edge device stores the mapping data in the local cache along with the caching TTL of the mapping data. Once the physical address of the virtual machine is retrieved (e.g., from local cache at 608, or from map server 130 at 620) then at 624, the network traffic received by the edge device can be encapsulated toward the physical address of the virtual machine.

Figure 7:
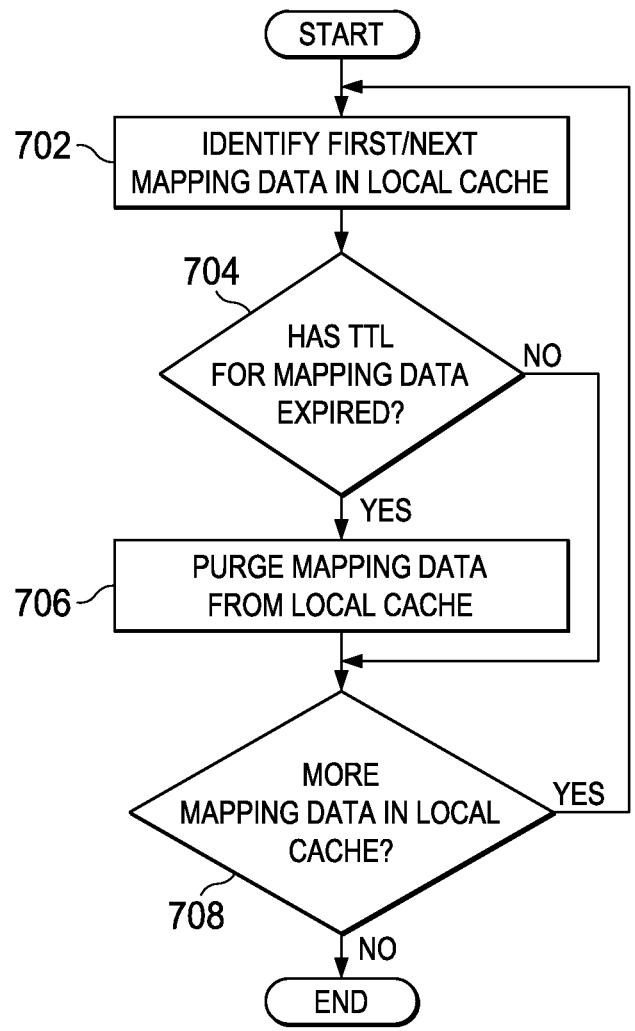
FIG. 7 is a flowchart illustrating yet further operations associated with the computing system according to at least one embodiment.

FIG. 7 is a flow chart illustrating possible operations associated with embodiments of computing system 100. In an example, edge devices 110A, 110B may perform one or more operations illustrated in FIG. 7. In at least one embodiment, cache purge modules 111A, 111B of respective edge devices 110A, 110B are each configured to perform, when executed by one or more processors, one or more of the operations of FIG. 7.

Operations of FIG. 7 may be performed to purge a local cache of an edge device of any mapping data having an expired caching TTL. This may also be referred to as 'lazy cleanup' for a local cache. Operations of FIG. 7 may be performed periodically, or when certain events occur, or any combination thereof.

At 702, a first mapping data in a local cache, such as local cache 112B of edge device 110B, can be identified. In at least one embodiment, a caching TTL for the first mapping data is also stored in the local cache. Thus, the caching TTL can be read or otherwise obtained from the local cache. At 704, a determination is made as to whether the caching TTL for the has expired. If the caching TTL for the first mapping data has expired, then at 706, the first mapping data can be purged from the local cache. However, if the caching TTL of the first mapping data has not expired, then flow continues to 708.

At 708, it is determined whether more mapping data is stored in the local cache. If there is more mapping data, then flow continues at 702 where the next mapping data in the local cache is identified, and the assigned caching TTL is evaluated to determine whether the newly identified mapping data should be purged from the local cache. If there is no more mapping data in the local cache, as determined at 708, then the flow may end.

Figure 8:
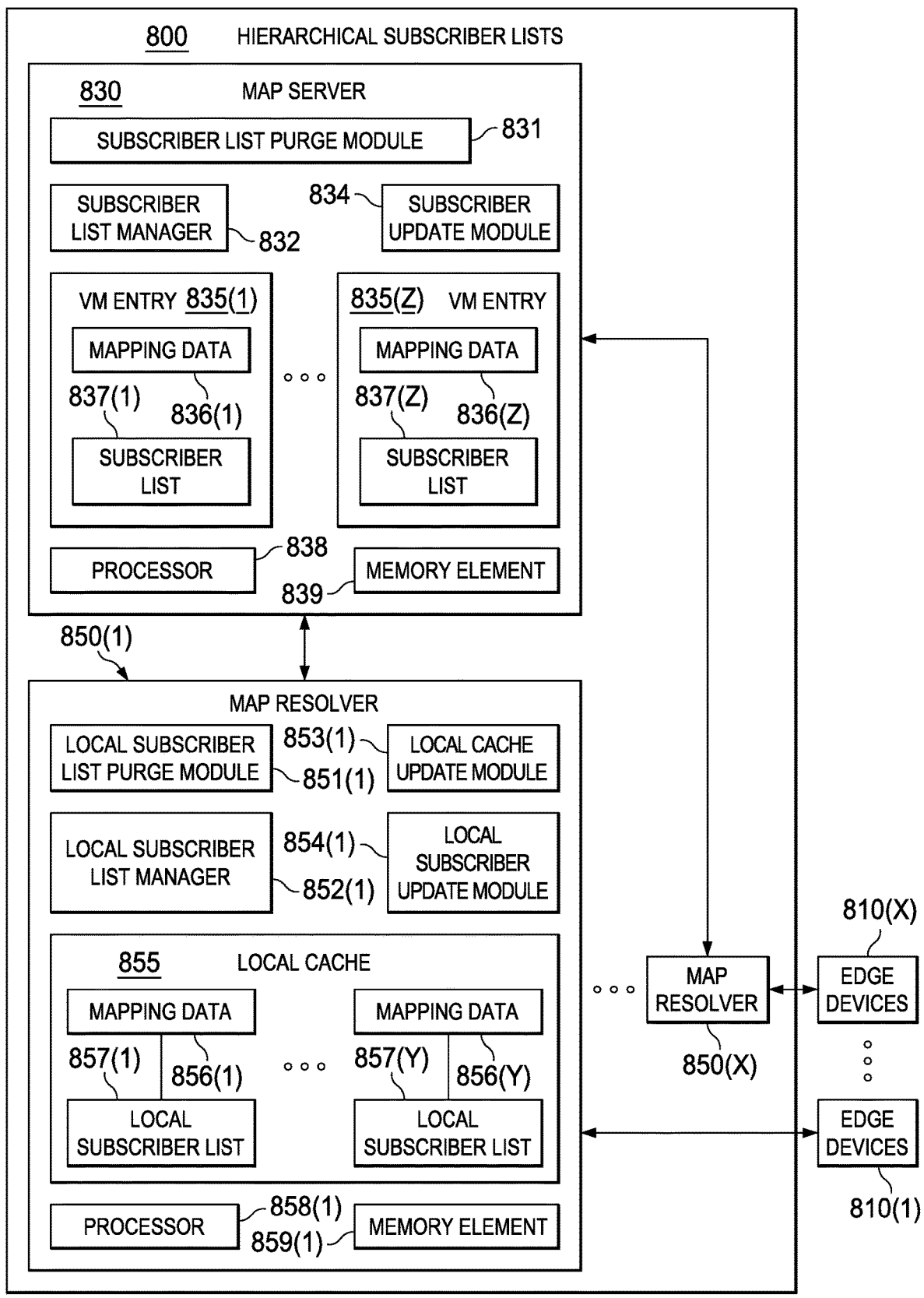
FIG. 8 is a simplified block diagram of hierarchical subscriber lists of another embodiment of a computing system for updating distributed caches of network devices in a virtualized network environment.

FIG. 8 is a block diagram of hierarchical subscriber lists 800 of another embodiment of a computing system for updating distributed caches of network devices in a virtualized network environment. Hierarchical subscriber lists 800 can be provided by a mapping system and a plurality of map resolvers 850(1)-850(X). The mapping system can comprise one or more map servers, such as map server 830, which may be connected in various arrangements (e.g., hierarchical, distributed hash table, etc.). Each map resolver may be connected to a set of edge devices. The sets of edge devices are represented by edge devices 810(1)-(X) connected, respectively, to map resolvers 850(1)-(X). Not shown are virtual machines and their corresponding physical servers attached to the edge devices. Each edge device in the sets of edge devices 810(1)-(X), may be attached to one or more physical servers, as shown and described with reference to FIG. 1. Each physical server may host one or more virtual machines, also shown and described, for example, with reference to FIG. 1. Generally, hierarchical subscriber lists 800 provided by map server 830 and map resolvers 850(1)-(X) can provide the same functionality to corresponding edge devices 810(1)-(X) as map server 130 of FIG. 1 provides to corresponding edge devices 110A and 110B.

Map server 830 generally be configured like map server 130 of FIG. 1. Map server 830 can include a subscriber list purge module 831, a subscriber list manager 832, a subscriber update module 834, and virtual machine (VM) entries 835(1)-(Z) for each virtual machine in the network, where 'Z' corresponds to the number of virtual machines in the network. Each VM entry can include a mapping data (e.g., mapping data 836(1)-(Z)) and a subscriber list (e.g., subscriber lists 837(1)-(Z)). A mapping data and subscriber list in a VM entry of map server 830 are associated with a virtual machine identified by the VM entry. A mapping data in a VM entry provides a virtual to physical address mapping for the virtual machine identified by the VM entry. Map server 830 may also include at least one processor 838 and at least one memory element 839.

A subscriber list in a VM entry of map server 830 can store information for each map resolver subscribed to the VM identified by the VM entry. In at least some scenarios, the same subscriber list of map server 830 can also store information for each edge device that is not configured to communicate with a map resolver, but is subscribed to the VM via map server 830 directly (i.e., without an intermediate map resolver). Subscriber information stored in a subscriber list of map server 830 can include information required to reach any map resolver and/or edge device subscribed to the corresponding VM. For example, subscriber list 837(1) of VM entry 835(1), can store information required to reach map resolver 850(1) if map resolver 850(1) has subscribed to the VM identified by VM entry 835(1). Subscriber list 837(1) of VM entry 835(1) could also store information required to reach an edge device (not shown) if the edge device has subscribed, via map server 830 directly, to the VM identified by VM entry 835(1). In at least one embodiment, this reachability information identifies a map resolver or edge device and can include, for example, a device identifier (ID), or device Internet Protocol (IP) address and control port, or any combination thereof, depending on the properties of the deployed network architecture.

A network management framework, such as network management framework 140 shown and described with reference to FIG. 1, may also be provided to communicate with map server 830. The network management framework can provide, to map server 830, physical address updates that occur in the virtualized network environment. Accordingly, the appropriate mapping data 836(1)-(Z) can be updated with physical address updates received from the network management framework. An edge device assigned as the new location of a virtual machine can also update map server 830.

Map resolvers 850(1)-850(X) can generally include the same components and modules, but may store and process the same and/or different data, according to what type of network traffic each one receives. For simplicity, the components of map resolver 850(1) will be described and referenced herein. It will be appreciated that the description is also applicable to other map resolvers that may be implemented in hierarchical subscriber lists 800, such as map resolvers 850(2)-(X).

Map resolver 850(1) can be configured with appropriate hardware including, for example, at least one processor 858(1) and at least one memory element 859(1). Map resolver 850(1) can also be configured with other modules and components, including a local subscriber list purge module 851(1), a local subscriber list manager 852(1), a local cache update module 853(1), a local subscriber update module 854(1), and a local cache 855 that includes mapping data 856(1)-(Y) and respective local subscriber lists 857(1)-(Y). Different mapping data can be stored for each virtual machine identified in a map request from one or more edge devices of the set of edge devices 810(1) in the network. The number of distinct entries of mapping data 856(1)-(Y) can vary depending on how many queries are received by map resolver 850(1) for mapping data of distinct virtual machines, and whether a caching TTL for the mapping data has expired without being renewed. Thus, 'Y' corresponds to the number of distinct virtual machines for which edge devices 810(1) have requested mapping data, which are each currently assigned an unexpired (or renewed) caching TTL.

Each entry of mapping data in local cache 855 can be linked, or otherwise associated with, a local subscriber list (e.g., local subscriber lists 857(1)-(Y)). Each pair of mapping data and local subscriber list (e.g., mapping data 856(1) and local subscriber list 857(1)) is associated with a distinct virtual machine in the virtualized network. The mapping data provides a virtual to physical address mapping for the virtual machine. The subscriber list provides a list of edge devices, if any, subscribed to the VM via map resolver 850(1).

In at least one embodiment, hierarchical subscriber lists 800 may be used in very large scale deployments. Hierarchical subscriber lists 800 may be used to enable better scaling of the notification process, when changes occur to virtual machines in the network. In a more specific example, hierarchical subscriber lists 800 can introduce intermediate entities, or map resolvers 850(1)-(X), to delegate the subscriber list processing for edge devices in the network. Map resolvers can act as a proxy to map server 830. Edge devices (e.g., of edge devices 810(1)-(X)) can query map resolvers 850(1)-(X), which then query map server 830 for mapping data (e.g., 836(1)-(Z)) of a desired virtual machine. Map server 830 can store the querying map resolver as a subscriber to the desired virtual machine in the appropriate subscriber list (e.g., 837(1)-(Z)).

Map server 830 can send a response to the querying map resolver. with the response can include mapping data for the desired virtual machine. For simplicity, reference is made to map resolver 850(1) as the querying map resolver. When map resolver 850(1) receives the requested mapping data from map server 830, it may be locally cached in local cache 855, for example, mapping data 856(1). In addition, the querying edge device (e.g., of edge devices 810(1)) can be added to local subscriber list 857(1), which is associated with mapping data 856(1). Map resolver 850(1) also forwards the mapping data of the desired virtual machine to the querying edge device of edge devices 810(1).

Edge devices represented by edge devices 810(1) are configured to use map resolver 850(1) as a proxy to map server 830. Other edge devices of edge devices 810(2)-(X) can be configured to use other map resolvers (e.g., 850(2)-(X)) as a proxy to map server 830. If a map resolver (e.g., 850(1)) has particular mapping data locally cached, then it can respond to a query from an edge device for the particular mapping data, without querying map server 830. As a result, map server 830 may store querying map resolvers 850(1)-850(X), rather than querying edge devices 810(1)-(X), in its map resolver subscriber lists 837(1)-(Z) of VM entries 835(1)-(Z). As previously indicated, however, some edge devices (not shown) may not be configured to communicate with a map resolver and, therefore, such edge devices may subscribe to virtual machines via map server 830 directly. In such a scenario, a particular subscriber list of map server 830 could include subscriber information for both edge devices and map resolvers that subscribe to the virtual machine associated with that particular subscriber list.

Each map resolver 850(1)-(X) maintains a local subscriber list of subscribed edge devices per mapping data in local cache 855. For example, map resolver 810(1) maintains local subscriber lists 857(1)-(Y) per mapping data 856(1)-(Y). Each pair of mapping data and local subscriber list is associated with a virtual machine, for which at least one edge device of edge devices 810(1) has requested mapping data.

When a change occurs in mapping data (e.g., a virtual machine is migrated, added, or removed), map server 830 receives the physical address update from, for example, a network management framework (e.g., 140). Map server 830 can update the appropriate mapping data (e.g., 836(1)-(Z)) and generate a notification signal with the updated mapping data. The notification signal can be sent to all map resolvers and edge devices that are subscribed to the particular virtual machine that has changed. For example, assuming only map resolvers are subscribed to the virtual machine identified by VM entry 835(1), a notification signal can be sent to all map resolvers listed in subscriber list 837(1) when mapping data 836(1) is updated with a physical address update for its associated virtual machine.

Each map resolver that receives a notification signal can update its locally cached mapping data with the new mapping data in the notification signal. These map resolvers can then forward the notification to all edge devices in their local subscriber lists that are associated with the updated mapping data in the local cache. As a result, processing of subscriber lists containing one or more edge devices (e.g., from the sets of edge devices 810(1)-(X)) is offloaded to multiple map resolvers 850(1)-(X) in a hierarchical manner. Thus, the load on map server 830 can be reduced, particularly in a very large scale deployment.

In the embodiment of a computing system that implements hierarchical subscriber lists 800, edge devices 810(1)-(X) may be configured the same as edge devices 110A and 110B described with reference to FIG. 1. In the implementation with hierarchical subscriber lists 800, however, sets of edge devices 810(1)-(X) may be configured to send map requests to respective map resolvers 850(1)-850(X) and to receive responses to the map requests from the map resolvers.

Figure 9:
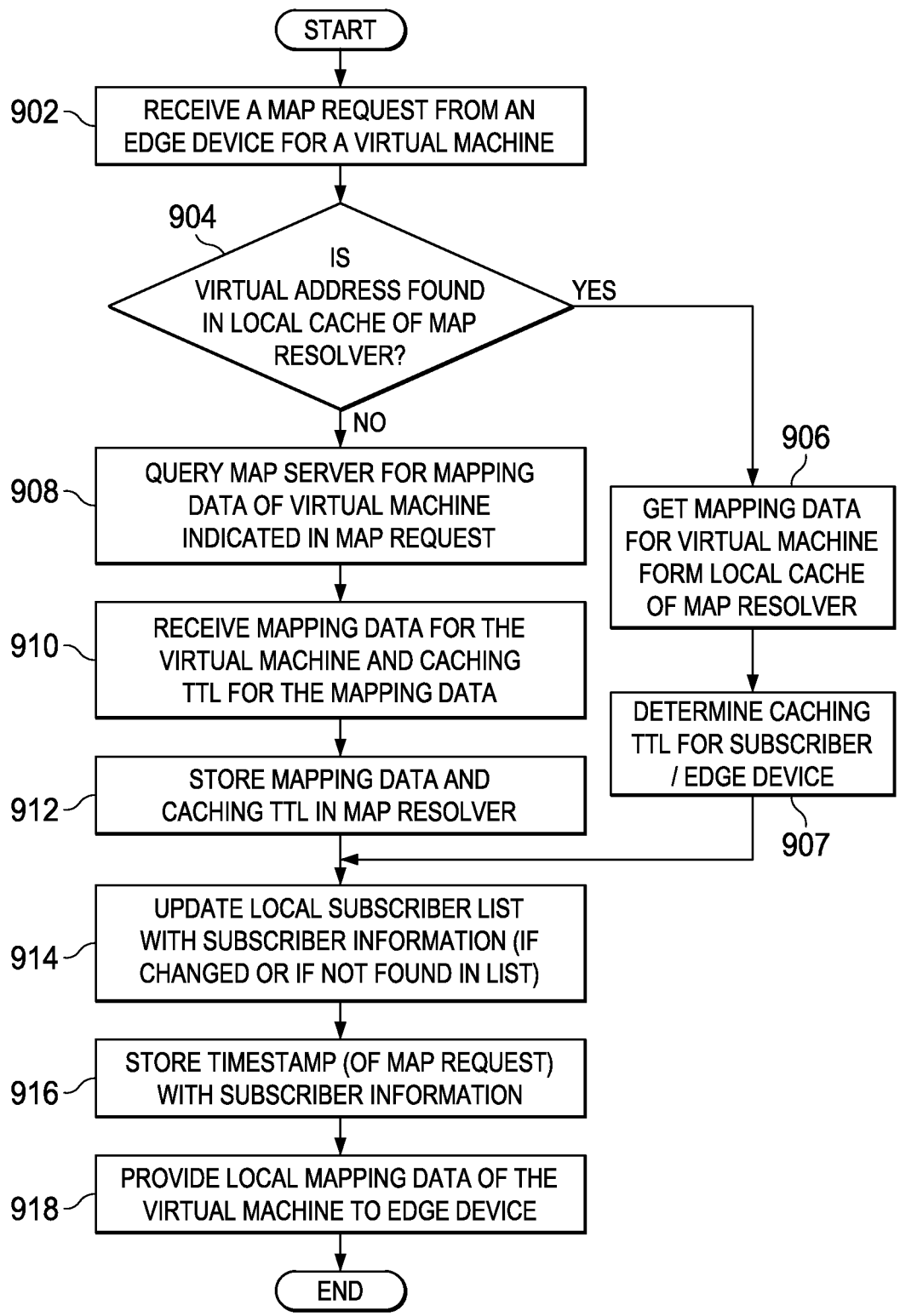
FIG. 9 is a flowchart illustrating activities associated with the computing system with hierarchical subscriber lists of FIG. 8, according to at least one embodiment.

Turning to FIG. 9, FIG. 9 is a flow chart illustrating operations associated with embodiments of a computing system configured with hierarchical subscriber lists 800. In an example, map resolvers 850(1)-(X) may each perform one or more operations illustrated in FIG. 9. In at least one embodiment, a local subscriber list manager, such as local subscriber list manager 852(1), is configured to perform one or more operations of FIG. 9 when executed by one or more processors. For simplicity, FIG. 9 will be described with reference to map resolver 850(1) and its components.

At 902, map resolver 850(1) receives a map request from an edge device for mapping data of a virtual machine. The map request indicates a virtual address of the virtual machine. Map resolver 850(1) may search local cache 855 for the virtual address of the virtual machine. At 904, a determination is made as to whether the virtual address of the virtual machine is found in any mapping data 856(1)-(Y) of local cache 855. If the virtual address is found, for example, in mapping data 836(1), then at 906, mapping data 836(1) of the virtual machine is obtained from local cache 855. At 907, a caching TTL is determined for the subscriber information of the edge device to be stored in subscriber list 837(1). In at least one embodiment, the caching TTL for the subscriber information is equal to a remaining amount of time of the caching TTL assigned to mapping data 836(1). Caching TTLs, however, are configurable in at least some embodiments. Thus, the caching TTL assigned to the subscriber information of a particular subscriber may not expire at the same time that the caching TTL assigned to the associated mapping data expires.

With reference again to 904, if the virtual address is not found in local cache 855, then at 908, map resolver 850(1) may query map server 830 for mapping data of the virtual machine indicated in the map request received from the edge device. The query may indicate the virtual address of the virtual machine. At 910, map resolver 850(1) receives, from map server 830, a response to the query that includes mapping data for the virtual machine. The response may also include a caching TTL for the mapping data. At 912, map resolver 850(1) may store the received mapping data in local cache 855. The caching TTL assigned to the mapping data may also be stored in local cache 855.

At 914, after mapping data is received from map server 830 at 910, or obtained from locally cached mapping data at 906, the edge device may be added as a subscriber to the appropriate subscriber list in local cache 855. For example, if mapping data 856(1) is associated with the virtual machine identified in the map request, then subscriber list 857(1) can be updated with subscriber information of the edge device. If there is no subscriber list currently associated with the mapping data in local cache 855, however, then one may be created and associated with the mapping data.

In at least one embodiment, the subscriber information may also include a caching TTL assigned to the subscriber information. If the map resolver queried map server 830 for the mapping data, then in at least one embodiment, the caching TTL assigned to the subscriber information can be equivalent to the caching TTL assigned to the mapping data. If the map resolver did not query map server 830 for the mapping data because the desired mapping data was already locally cached, then in at least one embodiment, the caching TTL assigned to the subscriber information can be the TTL determined at 907 (e.g., the remaining time of the caching TTL assigned to the mapping data).

At 916, a timestamp (e.g., of the map request) may also be stored with the subscriber information in order to monitor whether the caching TTL assigned to the subscriber information has expired. At 918, map resolver 850(1) can provide the mapping data associated with the virtual machine to the edge device that sent the map request, in addition to a caching TTL for the mapping data. In at least one embodiment, this caching TTL for the mapping data to be stored in the edge device can be equivalent to the caching TTL assigned to the subscriber information in map resolver 850(1).

Other modules and components of map resolvers 850(1)-(X) may function in generally the same or similar manner as modules and components described with reference to map server 130 and edge devices 110A, 110B of FIG. 1. In particular, local subscriber purge module 851(1) may function similarly to subscriber list purge module 131 of map server 130. Local subscriber purge module 851(1) can be configured to purge any subscriber information from subscriber lists 857(1)-(Y) when the caching TTLs assigned to the subscriber information have expired. This purging may be performed periodically (e.g., predetermined periods of time), or when certain events occur, or any combination thereof.

Local cache update module 853(1) may function similarly to cache purge modules 111A, 111B of edge devices 110A, 110B in FIG. 1. Generally, local cache update module 853(1) can be configured to purge an entry of mapping data (e.g., 856(1)-(Y)) and its associated subscriber list (e.g., 857(1)-(Y)) when a caching TTL assigned to the mapping data expires. In at least one embodiment, however, when mapping data, such as mapping data 856(1), is close to expiration, local cache update module 853(1) can determine whether subscriber list 857(1) contains any valid subscriber information. The subscriber information is considered 'valid' if a caching TTL assigned to that subscriber information has not expired. If subscriber list 857(1) has at least one valid entry of subscriber information, then map resolver 850(1) can send a request to map server 830 to renew the caching TTL assigned to mapping data 836(1). Thus, mapping data 836(1) and its associated subscriber list 857(1) may not be purged as long as the subscriber list contains any valid subscriber information. If subscriber list 857(1) has no more subscriptions (i.e., all subscriber information has been purged, caching TTLs assigned to subscriber information have all expired), then mapping data 856(1) and subscriber list 857(1) can be purged when the caching TTL assigned to the mapping data expires. In this instance, when map resolver 850(1) subsequently receives a map request from an edge device for mapping data of the same VM, then map resolver 850(1) queries map server 830 again for mapping data of the same VM.

In map resolver 850(1), local subscriber update module 854(1) may function similarly to subscriber update module 134. When a change occurs to a virtual machine in the network, and if map resolver 850(1) is subscribed to the virtual machine in map server 830, then map resolver 850(1) can receive a notification signal from map server 830 indicating a change to the mapping data for the changed VM. Map resolver 850(1) can then update its locally cached mapping data associated with the changed VM. Map resolver 850(1) may also forward the notification signal to all of the subscribers in the local subscriber list associated with the updated mapping data of the changed VM.

With reference to map server 830, its modules and components may function in generally the same or substantially similar manner as modules and components described with reference to map server 130 of FIG. 1. In particular, subscriber list purge module 831 may function similarly to subscriber purge module 131, subscriber list manager 832 may function similarly to subscriber list manager 132, and subscriber update module 834 may function similarly to subscriber update module 134. Map server 830 can treat map resolvers and directly subscribed edge devices, if any, in the same manner by adding them to subscriber lists, purging them from subscriber lists when their subscription TTLs expires, and sending notification signals to them when updates occur to virtual machines in the virtualized network.

Note that in certain example implementations, the updating functions outlined herein may be implemented by software, logic, processor instructions, code, etc. encoded in one or more tangible computer readable storage media (e.g., embedded logic provided in an application specific integrated circuit (ASIC), digital signal processor (DSP) instructions, software (potentially inclusive of object code and source code) to be executed by a processor or other similar machine, instructions in software, hardware, firmware, or any combination thereof, etc.). This tangible media may be non-transitory in at least one embodiment. In some of these instances, one or more memory elements (as shown in FIGS. 1 and 8) can store data used for the operations described herein. This includes the memory elements being able to store software, logic, code, and/or processor instructions that are executed to carry out the activities described herein. A processor can execute any type of instructions associated with the data to achieve the operations detailed herein. In one example, a processor (as shown in FIGS. 1 and 8) could transform an element or an article (e.g., data) from one state or thing to another state or thing. In another example, the updating activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In general, network devices such as edge devices 110A, 110B, map resolvers 850(1)-(X), and edge devices 810(1)-(X), as well as map server 130, physical servers 122A(1)-122A(J) and 122B(1)-122B(K), network management framework 140, and map server 830, are network elements that facilitate electronic communication with virtual machines in a given network. As used herein, the term 'network element' is meant to encompass routers, switches, wireless access points (WAPs), gateways, bridges, loadbalancers, appliances, firewalls, servers, processors, apparatuses, modules, or any other suitable device, component, element, proprietary appliance, or object operable to receive, send, process, store, or manage data and information associated with computing system 100. A network element may include any suitable hardware, software, firmware, components, modules, interfaces, or objects that facilitate the operations thereof. This may be inclusive of appropriate algorithms and communication protocols that allow for the effective exchange of data or information. Further, network elements may be adapted to execute any operating system, including Linux, UNIX, Windows Server, etc. Additionally, at least some of the network elements, such as physical servers 122A(1)-(J) and 122B(1)-(K), may be configured with virtual machines and a hypervisor adapted to virtualize execution of a particular operating system, including customized and proprietary operating systems.

Note that in at least one example, each of these elements can have an internal structure (e.g., processors 118A, 118B, 138, 838, 858(1), etc.) to facilitate at least some of the operations described herein. In other embodiments, the activities that enable updating distributed caches of edge devices and other network devices (e.g., map resolvers 850(1)-(X)) may be executed externally to these elements, or included in some other network element to achieve this intended functionality. In at least one embodiment, map resolvers 850(1)-(X) and map servers 130, 830 may include this logic (or reciprocating logic) that can coordinate with other network elements in order to achieve the operations, as outlined herein. Furthermore, one or several devices may include any suitable algorithms, hardware, firmware, software, components, modules, interfaces, or objects that facilitate the operations thereof.

In at least one example implementation, map servers 130, 830, and map resolvers 850(1)-(X) of embodiments of a computing system, such as computing system 100, may include logic in order to achieve the updating functions outlined herein. These activities can be facilitated by various modules (e.g., subscriber list purge module 131, 831, subscriber list manager 132, 832, subscriber update module 134, 834, local subscriber list purge module 851(1), local subscriber list manager 852(1), local cache update module 853(1), local subscriber update module 854(1), etc.), which can be suitably combined in any appropriate manner, or partitioned in any appropriate manner, and which may be based on particular configuration and/or provisioning needs. Additionally, these network elements may include one or more processors (e.g., processors 138, 838, 858, etc.) that can execute software, an algorithm, or other instructions to perform the updating operations, as disclosed herein. These network elements may further keep information, to be used in achieving the updating activities as discussed herein, in any suitable memory element (random access memory (RAM), read only memory (ROM), EPROM, EEPROM, ASIC, etc.), software, firmware, hardware, or in any other suitable component, device, element, or object where appropriate and based on particular needs. Any of the memory items discussed herein (e.g., repositories, stores, databases, caches, tables, etc.) should be construed as being encompassed within the broad term 'memory element.' Moreover, particular reference to any one type of memory item (e.g., cache) is not intended to be limiting and such memory items may be substituted with any number of other memory items. Additionally, any of the potential processing elements, modules, and machines described in this Specification should be construed as being encompassed within the broad term 'processor.' Each of the network elements can also include suitable interfaces for receiving, transmitting, and/or otherwise communicating data or information in a virtualized network environment.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that embodiments of computing system 100 and their teachings are readily scalable and can accommodate a large number of components, as well as more complicated/sophisticated arrangements and configurations. Accordingly, the examples provided should not limit the scope or inhibit the broad teachings of computing system 100 as potentially applied to a myriad of other architectures or implementations.

As used herein, unless expressly stated to the contrary, use of the phrase 'at least one of' refers to any combination of the named elements, conditions, or activities. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. The use of these terms is not intended to indicate any type of order, rank, importance, temporal sequence, or hierarchy of the modified noun. For example, 'first X' and 'second X' are intended to designate two separate X elements that may or may not be equivalent and that are not necessarily limited by any order, rank, importance, temporal sequence, or hierarchy of the two elements.

It is also important to note that the activities, interactions, and operations in the preceding flow diagrams illustrate only some of the possible scenarios and patterns that may be executed by, or within, embodiments of computing system 100. Some of these activities, interactions, and/or operations may be deleted or removed where appropriate, or may be modified or changed considerably without departing from the scope of the present disclosure. In addition, a number of these activities, interactions, and/or operations have been described as being executed concurrently with, or in parallel to, one or more additional activities, interactions, and/or operations. However, the timing of these activities, interactions, and/or operations may be altered considerably. The preceding operational flows have been offered for purposes of example and discussion. Substantial flexibility is provided by computing system 100 that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although computing system 100 has been illustrated with reference to particular elements and operations that facilitate the updating functions, these elements and operations may be replaced by any suitable architecture, protocols, and/or processes that achieve the intended functionality of computing system 100.

What is claimed is:

1. A method, comprising:
   receiving, at a map resolver from an edge device, a map request for a physical network address that corresponds to a virtual network address of a virtual machine;
   subsequent to the map being received by the map resolver, querying a map server for the physical network address that corresponds to the virtual network address of the virtual machine;
   receiving, at the map resolver, a response including mapping data of the virtual machine and a data caching time period associated with the mapping data, wherein the data caching time period defines a length of time during which the mapping data is not purged from the map resolver;
   associating, at the map resolver, a subscriber list to the mapping data, wherein the mapping data includes the physical network address of the virtual machine mapped to the virtual network address of the virtual machine;
   adding, at the map resolver, subscriber information of the edge device to the subscriber list, wherein the subscriber information includes a subscriber caching time period and an identification of the edge device, wherein the subscriber information indicates that the edge device is to receive notifications of changes to the physical network address of the virtual machine;
   prior to the data caching time period expiring, determining whether at least one subscriber caching time period with the subscriber list has not expired; and
   based on determining that the subscriber caching time period has not expired, sending a request to the map server to renew the data caching time period.

2. The method of claim 1, wherein the identification of the edge device includes one or more of a device identifier and address information, wherein the address information includes an Internet Protocol address and a control port of the edge device.

3. The method of claim 1, further comprising:
   sending, if the virtual machine moves to a different server, a notification signal with new mapping data of the virtual machine to each one of one or more edge devices identified in corresponding subscriber information stored in the subscriber list.

4. The method of claim 1, further comprising:
   purging the subscriber information from the subscriber list based on the subscriber caching time period associated with the subscriber information expiring.

5. The method of claim 1, wherein the subscriber information includes a timestamp of the map request, the method further comprising:
   determining the subscriber caching time period has expired based on a current time minus the subscriber caching time period being greater than the timestamp.

6. The method of claim 1, wherein each edge device that has previously sent, to the map resolver, a map request to obtain the physical network address of the virtual machine is identified in corresponding subscriber information in the subscriber list if a corresponding subscriber caching time period assigned to the corresponding subscriber information has not expired.

7. The method of claim 1, wherein the subscriber caching time period defines a length of time during which the subscriber information is not purged from the subscriber list.

8. The method of claim 1, further comprising:
   prior to the renewed data caching time period expiring, determining whether at least one subscriber caching time period associated with the subscriber list has not expired; and
   based on determining that all subscriber caching time periods associated with the subscriber list have expired, purging the mapping data from the map resolver.

9. The method of claim 4, wherein the purging includes purging other subscriber information of at least one other edge device in the subscriber list based on another subscriber caching time period assigned to the other subscriber information expiring.

10. An apparatus, comprising:
    at least one processor; and
    at least one memory element comprising instructions that when executed by the at least one processor cause the apparatus to:
    receive, at a map resolver from an edge device, a map request for a physical network address that corresponds to a virtual network address of a virtual machine;
    subsequent to the map request being received by the map resolver, query a map server for the physical network address that corresponds to the virtual network address of the virtual machine;
    receive, at the map resolver, a response including mapping data of the virtual machine and a data caching time period associated with the mapping data, wherein the data caching time period defines a length of time during which the mapping data is not purged from the map resolver;
    associate a subscriber list to the mapping data, wherein the mapping data includes the physical network address of the virtual machine mapped to the virtual network address of the virtual machine;
    add subscriber information of the edge device to the subscriber list, wherein the subscriber information includes a subscriber caching time period and a identification of the edge device, wherein the subscriber information indicates that the edge device is to receive notification of changes to the physical network address of the virtual machine;
    prior to the data caching time period expiring, determine whether at least one subscriber caching time period associated with the subscriber list has not expired; and
    based on the determining that the subscriber caching time period has not expired, send a request to the map server to renew the data caching time period.

11. The apparatus of claim 10, wherein the instructions when executed by the at least one processor further cause the apparatus to:
    send, the virtual machine moves to a different server, a notification signal with new mapping data of the virtual machine to each one of one or more edge devices identified in corresponding subscriber information stored in the subscriber list.

12. The apparatus of claim 10, wherein each edge device that has previously sent a map request to the apparatus to obtain the physical network address of the virtual machine is identified in corresponding subscriber information in the subscriber list if a corresponding subscriber caching time period assigned to the corresponding subscriber information has not expired.

13. At least one non-transitory computer readable storage medium encoded with instructions that, when executed by at least one processor, cause the processor to:
  received, at a map resolver from an edge device, a map request for a physical network address that corresponds to a virtual network address of a virtual machine;
  subsequent to the map request being received by the map resolver, query a map server for the physical network address that corresponds to the virtual network address of the virtual machine;
  receive, at the map resolver, a response including mapping data of the virtual machine and a data caching time period associated with the mapping data, wherein the data caching time period defines a length of time during which the mapping data is not purged from the map resolver;
  associate, at the map resolver, a subscriber list to the mapping data, wherein the mapping data includes the physical network address of the virtual machine mapped to the virtual network address of the virtual machine;
  add, at the map resolver, subscriber information of the edge device to the subscriber list, wherein the subscriber information includes a subscriber caching time period and an identification of the edge device, wherein the subscriber information indicates that the edge device is to receive notifications of changes to the physical network address of the virtual machine;
  prior to the data caching time period expiring, determine whether at least one subscriber caching time period associated with the subscriber list has not expired; and
  based on determining that the subscriber caching time period has not expired, send a request to the map server to renew the data caching time period.

14. The apparatus of claim 10, wherein the subscriber caching time period defines a length of time during which the subscriber information is not purged from the subscriber list.

15. The apparatus of claim 10, wherein the instructions when executed by the at least one processor further cause the apparatus to:
  prior to the renewed data caching time period expiring, determine whether at least one subscriber caching time period associated with the subscriber list has not expired; and
  based on determining that all subscriber caching time periods associated with the subscriber list have expired, purge the mapping data from the apparatus.

16. The at least one non-transitory computer readable storage medium of claim 13, wherein the identification of the edge device includes one or more of a device identifier and address information, wherein the address information includes an Internet Protocol address and a control port of the edge device.

17. The at least one non-transitory computer readable storage medium of claim 13, wherein the instructions, when executed by the at least one processor, further cause the processor to:
  send, if the virtual machine moves to a different server, a notification signal with new mapping data of the virtual machine to each one of one or more edge devices identified in corresponding subscriber stored in the subscriber list.

18. The at least one non-transitory computer readable storage medium of claim 13, wherein each edge device that has previously sent, to the map resolver, a map request to obtain the physical network address of the virtual machine is identified in corresponding subscriber information in the subscriber list if a corresponding subscriber caching time period assigned to the corresponding subscriber information has not expired.

19. The at least one non-transitory computer readable storage medium of claim 13, wherein the instructions, when executed by the at least one processor, further cause the processor to:
  prior to the renewed data caching time period expiring, determine whether at least one subscriber caching time period associated with the subscriber list has not expired; and
  based on determining that all subscriber caching time periods associated with the subscriber list have expired, purge the mapping data from the resolver.

20. The at least one non-transitory computer readable storage medium of claim 13, wherein the instructions, when executed by the at least one processor, further cause the processor to:
  purge the subscriber information from the subscriber list based on the subscriber caching time period associated with the subscriber information expiring.

* * * * *